3,166,595
N,N-DIFLUOROALKYLAMINES
Jack W. Frazer, Livermore, Calif., assignor to the United States of America as represented by the United States Atomic Energy Commission
No Drawing. Filed Mar. 28, 1961, Ser. No. 98,985
3 Claims. (Cl. 260—583)

This invention relates to organic alkyl amines and, more particularly, to a new series of compounds, N,N-difluoroalkylamines.

Compounds containing nitrogen and fluorine are currently the subject of extensive research, since such compounds have utility as explosives and rocket fuels. Generally speaking, such N–F compounds form gaseous HF as one of their decomposition products. During decomposition the high heat of formation of HF (64 kilo calories/mole) is liberated to the surroundings, thereby doing mechanical work. In addition during the course of decomposition, fluorine is present as an oxidizing agent, whereby no external source is required to complete oxidation. Such materials find use as mono propellants in rocket technology.

The present invention provides a new series of nitrogen-fluorine compounds, the N,N-difluoroalkylamines. More particularly, the invention provides the new compounds N,N-difluoromethylamine and N,N-difluoroethylamine.

Cross-reference is made to applicant's copending application Ser. No. 385,823, filed July 9, 1964, in the name of Jack W. Frazer, for Method for the Preparation of N,N-Difluoroalkylamines, which is directed to a novel method for synthesizing such new compounds; that application is a division of the instant application.

Accordingly, the main object of the invention is to provide N,N-difluoroalkylamines for use in rocket fuels and explosives.

Another object of the invention is to provide the new compounds N,N-difluoromethylamine and N,N-difluoroethylamine.

The novel synthesis method adverted to hereinabove comprises the reaction of alkyl halides with tetrafluorohydrazine ($N_2F_4$) in the presence of ultraviolet radiation to form N,N-difluoroalkylamines ($RNF_2$). The synthesis is summarized by reaction (1):

1) 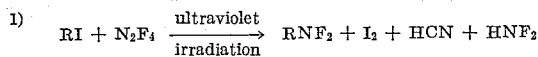

$$RI + N_2F_4 \xrightarrow{\text{ultraviolet irradiation}} RNF_2 + I_2 + HCN + HNF_2$$

where R=alkyl group

The tetrafluorohydrazine required in reaction (1) may be prepared by a mercury discharge excitation process described in my co-pending application Serial No. 21,571, filed April 11, 1960, now U.S. Patent No. 3,033,771, and reported in the Journal of Inorganic and Nuclear Chemistry, 11, 166(1959). Separation of the N,N-difluoroalkylamine from other reaction products, and from unreacted starting materials, is accomplished by gas chromatography followed by cold-trap distillation.

The term "ultraviolet radiation" will hereinafter be used to mean radiation in that portion of the electromagnetic spectrum whose wavelength lies between 1,000 and 4,000 angstrom units (A).

The ultraviolet irradiation of the reactants is preferably performed in a quartz vessel, since quartz is substantially transparent to the entire ultraviolet as well as the visible portions of the spectrum. It has been found, however, that good yields of N,N-difluoroalkylamines can also be obtained if the reactants are irradiated in a Pyrex vessel (Pyrex is Corning Glass Co.'s brand of borosilicate glass).

There are several commercially available ultraviolet sources that can be used in the practice of the invention. Most of these sources are of the mercury vapor type, in which electrical excitation of mercury atoms gives rise to the emission of both ultraviolet and visible radiation. One such ultraviolet source that has been found convenient is the Hanovia Model 510B1, manufactured by the Hanovia Corp., 100 Chestnut St., Newark, New Jersey. This source emits radiation in the 2,000–6,000 A. range, with maximum ultraviolet intensity at 3,600 A.

As with all photochemical reactions, the product yield in reaction (1) varies inversely as the square of the reaction vessel's distance from the radiation source. Therefore, strictly from the standpoint of photochemical efficiency, it is desirable to place the reaction vessel as close to the source as possible. However, conventional ultraviolet sources develop considerable heat during operation and, unless this heat is absorbed by some type of cooling jacket, the reactants may suffer thermal decomposition if placed too close to the radiation source. Water makes an excellent absorbing medium for an ultraviolet source cooling jacket, since it absorbs most of the infrared radiation while allowing the ultraviolet to pass through substantially without attenuation. When a cooling jacket is provided, either on the source itself or as part of the reaction vessel, then the reactants can be disposed immediately adjacent the source with no danger of thermal decomposition.

If, on the other hand, no cooling means is provided, then the reaction vessel must be placed at some distance from the source to permit attenuation of the infrared radiation by the "inverse square rule." For example, it has been found that an uncooled Hanovia 510B1 source will produce good yields of the lower N,N-difluoroalkylamines when the reactants are irradiated at distances of 5–15 inches from the source. At these distances, thermal breakdown of the reactants is negligible, even with the uncooled source. Of course, for a given reaction yield, the irradiation exposure time is proportional to the square of the distance from the source, so that an uncooled system results in longer exposure times than one in which a cooling mechanism is provided. If quartz reaction vessels are used, exposure times can be decreased with no resulting decrease in reaction yield, since quartz is transparent to the more energetic short ultraviolet wavelengths, whereas the lower wavelength cutoff for Pyrex is about 3,000 A. Exposure times range from 10–20 hours when the reactants are irradiated in Pyrex vessels at distances of 5–15 inches from the uncooled Hanovia source. In common with other commercial ultraviolet sources, the Hanovia lamp does not yield a collimated beam, but radiates essentially isotropically into the surrounding space. Therefore, most of the radiant energy emitted is lost, and the reactants receive only a small fraction of the total emitted energy.

This "lost" energy can be recovered, and reactant exposure time considerably reduced, if the source and the reatcion vessel are disposed in a so-called "$4\pi$ geometry." In such an arrangement, the reaction vessel is shaped so as to completely surround the radiating source, and thus intercept the emitted energy which would otherwise be lost to the surrounding space. If the source is essentially spherical in shape, the $4\pi$ geometry is achieved by disposing the reactants in a spherical vessel into which a well has been formed. The ultraviolet source is placed in the vessel well, thereby providing uniform irradiation of the reactants.

If, as in the case of the Hanovia lamp, the ultraviolet source is cylindrical, a $4\pi$ geometry is approximated by disposing the reactants in a tubular reaction vessel, which is then positioned coaxially around the cylindrical ultraviolet source. Although a suitable $4\pi$ geometry is desirable from the standpoint of shortening the time required to obtain significant yields, the fabrication of the required reaction vessels is fairly expensive. Conventionally shaped vessels can be used instead of a $4\pi$ arrangement, but then, as mentioned above, exposure times range from 10–20 hours at distances of 5–15 inches from the source.

Reaction (1) can be used to synthesize N,N-difluoroalkylamines having straight chain alkyl groups of up to about six carbon atoms. Beyond this chain length, the reaction rate becomes too slow to be practicable, unless the reaction is conducted in the liquid phase. N,N-difluoroalkylamines having branched alkyl groups totaling more than six carbon atoms can be readily prepared by means of reaction (1), since secondary and tertiary alkyl halides are considerably more reactive with tetrafluorohydrazine than are primary alkyl halides. The reaction is preferably conducted with alkyl iodides, since they are the most reactive of the alkyl halides. Alkyl bromides and chlorides can also be employed, athough the reaction rates are considerably slower than when alkyl iodides are used.

Although the method of the invention has been described thus far with particular reference to the preparation of N,N-difluoroalkylamines, the same general method can be used to introduce the —$NF_2$ grouping into other classes of compounds in addition to the alkyl halides already discussed. It appears that irradiation with ultraviolet light produces two effects in the reacting mixture. First, the ultraviolet energy causes the tetrafluorohydrazine molecule to split into two —$NF_2$ groups. Second, free radical production is initiated in the reactants by the ultraviolet excitation. The highly reactive free radicals combine with the —$NF_2$ groups to form new molecules containing the —$NF_2$ grouping. Therefore, it is apparent that the method of the invention can be used to introduce the —$NF_2$ grouping into those molecules wherein free radical production can be initiated by ultraviolet irradiation.

The following examples illustrate a preferred method for synthesizing N,N-difluoroalkylamines and, in particular, N,N-difluoromethylamine and N,N-difluoroethylamine.

*Example I*

Purified $N_2F_4$ and reagent-grade $CH_3I$ were contained in a Pyrex reaction flask and irradiated for 20 hours at a distance of 11 inches from a Hanovia 510-B1 ultraviolet source. Initial quantities (in terms of partial pressures) of $N_2F_4$ and $CH_3I$, together with reaction yield data, are given in Table I.

TABLE I.—$CH_3NF_2$ YIELD DATA

| $N_2F_4$ partial press (cm. Hg) | $CH_3I$ partial press (cm. Hg) | $CH_3NF_2$,* percent yield | $HNF_2$,* percent yield | $HNF_2$,* percent yield | Percent Completion of Reaction |
|---|---|---|---|---|---|
| 2.59 | 2.59 | 4 | 20 | trace | 12 |
| 2.59 | 12.90 | 35 | 5–10 | 1 | 50 |
| 2.59 | 25.90 | 50 | 2–4 | 4 | 64 |
| 30.50 | 30.50 | 52 | 15 | 2.5 | 34 |

*Yield data is based on the amount of $N_2F_4$ reacted.

The temperature of the reactants was not controlled, and varied between 25° and 40° C. during the irradiation. After irradiation, the N,N-difluoromethylamine was separated from other reaction products and unreacted starting materials (HCN, $HNF_2$, $I_2$, $SiF_4$, $CH_3I$, and $N_2F_4$) by gas chromatography. The initial chromatographic separation was done on a column 10 feet long by ¼ inch inside diameter. The column was packed with 15 grams di-n-decyl phthalate per 100 grams of 60–80 mesh Johns-Manville C-22 firebrick. The separation was carried out at room temperature using helium carrier gas at a flow rate of 100 cc. per minute. Elution order was as follows: $N_2F_4$, $CH_3NF_2$, HCN, $HNF_2$, $CH_3I$. The separated $CH_3NF_2$ was then passed through a 30 foot column packed with 15 grams of oxydipropyl nitrile per 100 grams of C-22 firebrick. In order to remove traces of air and water, the $CH_3NF_2$ was distilled through a series of cold traps cooled with liquid $N_2$-acetone and liquid $N_2$-pentane slush mixtures. The fraction distilling between —95° and —130° C. was retained. Purity and identification were based on determination of molecular weight, mass spectrum, and infrared spectrum. The calculated molecular weight for $CH_3NF_2$ was 67.04, the determined molecular weight was 66.97. Some experimentally determined physical properties of $CH_3NF_2$ are given in Table II.

TABLE II.—$CH_3NF_2$ PHYSICAL PROPERTIES

Boiling point (760 mm.) $=-16.0°\pm0.1°$ C.
Melting point $=-114.8\pm0.3°$ C.
Density $=1.099\pm0.0005$ g./cc. at —20° C.
Vapor pressure (—69° to —19.3°C): $\log_{10}P=$ $$5.6731 - \frac{755.13}{T} - \frac{56631}{T^2}$$

(P=vapor pressure in cm. Hg, T=° K.)
Latent heat of vaporization at boiling point=5.48 kcal./mole It was found that $CH_3NF_2$ is very stable under the conditions obtaining during the synthesis reaction. Purified $CH_3NF_2$ was irradiated in Pyrex for 19 hours at a distance of 10 inches from the Hanovia source. Infrared spectroscopy indicated that no reaction had occurred. The thermal stability of $CH_3NF_2$ was tested by heating a purified sample in a Pyrex bomb for 100 minutes at 120° C. No change could be detected by mass spectrometry.

*Example II*

Purified $N_2F_4$ and reagent-grade $C_2H_5I$ were contained in a Pyrex flask and irradiated for 15 hours at a distance of 11 inches from the Hanovia ultraviolet source. Initial quantities (in terms of partial pressures) of $N_2F_4$ and $C_2H_5I$, together with reaction yield data, are given in Table III.

TABLE III.—$C_2H_5NF_2$ YIELD DATA

| $N_2F_4$ partial press (cm. Hg) | $C_2H_5I$ partial press (cm. Hg) | $N_2F_4$, percent reacted | Percent yield of $C_2H_5NF_2$ |
|---|---|---|---|
| 1.7 | 1.7 | 12 | 60 |
| 1.7 | 3.4 | 19 | 61 |
| 1.7 | 10.2 | 80 | 70 |

The temperature of the reactants was not controlled, and varied between 25° and 40° C. during the irradiation. The resulting N,N-difluoroethylamine was purified by gas chromatography on a 25 foot di-n-decyl phthalate column at room temperature. Column diameter and other operating conditions were the same as in Example I. Final purification of the $C_2H_5NF_2$ was done by a cold-trap distillation as in Example I. The fraction distilling between —95° and —130° C. was retained. Purity and identification were based on determination of molecular weight, mass spectrum and infrared spectrum. The molecular weight calculated for $C_2H_5NF_2$ was 81.07, the determined molecular weight was 81.08. Some experimentally determined physical properties of $C_2H_5NF_2$ are given in Table IV.

TABLE IV.—$C_2H_5NF_2$ PHYSICAL PROPERTIES

Boiling point $=14.9°\pm0.1°$ C.
Melting point $=-150.3°\pm0.3°$ C.
Density $=1.0165$ g./cc. at 0° C.
Vapor pressure (—32° to 14.4°C); $\log_{10}P=$ $$5.7005 - \frac{856.30}{T} - \frac{70345}{T^2}$$

(P=vapor pressure in cm. Hg, T=° K.)
Latent heat of vaporization at boiling point=6.14 kcal./mole Although a preferred mode of the invention has been described, and several examples thereof have been given, these are intended to be merely illustrative. It is intended that the scope of the invention be limited solely by what is claimed below.

What is claimed is:

1. The compounds N,N-difluoroalkylamines, having the formula

where R is a straight chain alkyl group having one to six carbon atoms.

2. The compound N,N-difluoromethylamine, having the formula

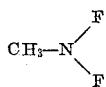

3. The compound N,N-difluoroethylamine, having the formula

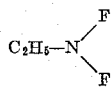

References Cited by the Examiner
UNITED STATES PATENTS

| | | | |
|---|---|---|---|
| 2,464,199 | 3/49 | Elderfield | 260—583 |
| 2,515,246 | 7/50 | McBee et al. | 260—583 |
| 2,807,579 | 9/57 | Molotsky et al. | 204—158 |
| 2,818,378 | 12/57 | Ishenjian | 204—158 |

OTHER REFERENCES

Jackson et al.: J. Am. Chem. Soc., vol. 69, pp. 1539–40 (1947).

CHARLES B. PARKER, *Primary Examiner.*

J. R. SPECK, L. ZITVER, *Examiners.*